United States Patent
Masputra

(10) Patent No.: US 10,841,962 B2
(45) Date of Patent: Nov. 17, 2020

(54) APPARATUS AND METHOD FOR ACCESSING A REMOTE NETWORK CONCURRENTLY WITH A TETHERED DEVICE ACCESSING THE REMOTE NETWORK

(71) Applicant: Apple Inc., Cupertino, CA (US)

(72) Inventor: Cahya Masputra, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/998,980

(22) Filed: Aug. 20, 2018

(65) Prior Publication Data

US 2018/0376521 A1    Dec. 27, 2018

Related U.S. Application Data

(63) Continuation of application No. 15/185,719, filed on Jun. 17, 2016, now Pat. No. 10,057,928, which is a
(Continued)

(51) Int. Cl.
*H04W 4/00*    (2018.01)
*H04W 76/10*    (2018.01)
(Continued)

(52) U.S. Cl.
CPC ............ *H04W 76/10* (2018.02); *H04L 69/16* (2013.01); *H04L 69/161* (2013.01); *H04L 69/22* (2013.01);
(Continued)

(58) Field of Classification Search
None
See application file for complete search history.

(56) References Cited

U.S. PATENT DOCUMENTS

| 5,410,543 A | 4/1995 | Seitz et al. |
| 5,610,593 A | 3/1997 | Seto |

(Continued)

FOREIGN PATENT DOCUMENTS

| CN | 101031134 | 9/2007 |
| EP | 1 912 128 A2 | 4/2008 |

(Continued)

OTHER PUBLICATIONS

PCT Search Report/Written Opinion, PCT/US201 0/031304, dated Aug. 2, 2010 15 pages.
(Continued)

*Primary Examiner* — Zewdu A Beyen
(74) *Attorney, Agent, or Firm* — Sterne, Kessler, Goldstein & Fox P.L.L.C.

(57) ABSTRACT

Embodiments include an apparatus and method for a handheld device that accesses a remote network, and also provides a tethered device with access to the same remote network. The handheld device may support multiple data flows between the tethering machine and the remote network, while the handheld device is capable of being used by a user to "surf" or otherwise access the same remote network. For example, if the remote network is the Internet and the handheld device is a "smart phone", a user of the smart phone can access the Internet concurrently while one or more applications on the tethering machine also accesses the Internet. Moreover, the smart phone may concurrently support other networked services that the smart phone is designed to provide such as voicemail services, messaging services, and telephony (cell phone) services.

20 Claims, 5 Drawing Sheets

Related U.S. Application Data continuation of application No. 12/426,897, filed on Apr. 20, 2009, now Pat. No. 9,398,136.

(51) Int. Cl.
*H04M 1/725* (2006.01)
*H04L 29/06* (2006.01)
*H04W 4/50* (2018.01)
*H04W 4/80* (2018.01)
*H04W 74/00* (2009.01)
*H04W 88/02* (2009.01)
*H04W 84/12* (2009.01)

(52) U.S. Cl.
CPC ... *H04M 1/72527* (2013.01); *H04M 1/72561* (2013.01); *H04W 4/50* (2018.02); *H04W 4/80* (2018.02); *H04W 74/00* (2013.01); *H04W 84/12* (2013.01); *H04W 88/02* (2013.01)

(56) References Cited

U.S. PATENT DOCUMENTS

| | | | |
|---|---|---|---|
| 5,907,815 | A | 5/1999 | Grimm et al. |
| 7,710,867 | B1 | 5/2010 | Masters |
| 8,276,809 | B2 | 10/2012 | Hugot et al. |
| 8,495,244 | B2 | 7/2013 | Bonar et al. |
| 9,398,136 | B2 | 7/2016 | Masputra |
| 10,057,928 | B2 | 8/2018 | Masputra |
| 2002/0163895 | A1 | 11/2002 | Haller et al. |
| 2003/0035397 | A1 | 2/2003 | Haller et al. |
| 2005/0030940 | A1 | 2/2005 | Abrol et al. |
| 2006/0172769 | A1 | 8/2006 | Oh |
| 2006/0239266 | A1 | 10/2006 | Babbar et al. |
| 2007/0127500 | A1 | 6/2007 | Maeng |
| 2007/0266173 | A1 | 11/2007 | Wong et al. |
| 2008/0028167 | A1 | 1/2008 | Sharma et al. |
| 2008/0248834 | A1 | 10/2008 | Chaterjee et al. |
| 2009/0013003 | A1 | 1/2009 | Chang et al. |
| 2009/0279543 | A1 | 11/2009 | Strom et al. |
| 2010/0034083 | A1* | 2/2010 | Prakash ................ H04W 28/18 370/230.1 |
| 2010/0087167 | A1 | 4/2010 | Tsumtome et al. |
| 2010/0267368 | A1 | 12/2010 | Masputra |
| 2011/0032914 | A1 | 2/2011 | Venkateswaran et al. |
| 2011/0096726 | A1 | 4/2011 | Schlack |
| 2016/0302242 | A1 | 10/2016 | Masputra |

FOREIGN PATENT DOCUMENTS

| | | |
|---|---|---|
| JP | 2004312392 | 11/2004 |
| JP | 2005507197 | 3/2005 |
| JP | 2006217490 | 8/2006 |
| JP | 2008530878 | 8/2008 |
| JP | 2008219762 | 9/2008 |
| WO | WO 03/034762 | 4/2003 |

OTHER PUBLICATIONS

Anonymous, WMWifiRouter—Get online with any device anywhere Morose Media, Mar. 31, 2009, XP002590032, http://globl.wmwifirouter.com/consumer/, pp. 4.

Samsung, "Pocket PC Phone SGH-i750 Series. User's Guide", Mar. 14, 2006, XP007903911, pp. 230, http://www.mobiles-actus.com/telechargement/manuel/samsung=sgh-i750-en.pdf.

Online Tech Tips, "How to make your laptop act as a router", Jun. 24, 2008, 2 pages.

EVDOinfo.com, "Windows Sharing EVDO" Feb. 17, 2005, 5 pages.

PCT International Preliminary Report on Patentability dated Nov. 3, 2011, for PCT/US2010/031304 filed Apr. 15, 2010, 8 pages.

Online Tech Tips, "How to make your laptop act as a router", Jun. 24, 2008, pp. 1-5.

A.C. Yokum, "My Cell Phone has a Wireless Router—Review of the Kyocera KR1 Mobile Router", Oct. 22, 2007, pg. 1-2.

Electronics Information Online, "Computer Network Router", Jan. 3, 2007, pp. 1-4.

* cited by examiner

APPARATUS AND METHOD FOR ACCESSING A REMOTE NETWORK CONCURRENTLY WITH A TETHERED DEVICE ACCESSING THE REMOTE NETWORK

CROSS-REFERENCE TO RELATED APPLICATIONS

This application is a continuation of U.S. patent application Ser. No. 15/185,719, filed Jun. 17, 2016, entitled Handheld Device Processing for Providing Data Tethering Services While Maintaining Suite of Handheld Service Functions ("'719 Application"), which is a continuation of U.S. application Ser. No. 12/426,897, filed Apr. 20, 2009, entitled Handheld Device Capable of Providing Data Tethering Services While Maintaining Suite of Handheld Service Functions, issued as U.S. Pat. No. 9,398,136, all of which are incorporated herein by reference in their entirety.

BACKGROUND

Field of the Invention

The field of invention relates generally to networking with handheld devices, and, more specifically, to a handheld device that is capable of providing data tethering services while maintaining handheld service functions.

Background

FIG. 1 shows a first prior art handheld device 102 that provides data tethering services. According to the depiction of FIG. 1, the handheld device is coupled to a tethering machine 101 (e.g., a computer such as a Personal Computer (PC), a laptop computer, a notebook computer, etc.). In a typical application, the tethering machine 101 lacks access to a network such as the Internet 105. The handheld device, which has access to the desired network 105, is locally coupled 103 to the tethering machine 101. The handheld device 102, through a wireless network 104 that the handheld device is communicatively coupled to, essentially acts as a gateway for the tethering machine 101 to the desired network 105. That is, the handheld device 102 and wireless network 104 act to support the tethering machine's ability to send/receive information to/from the desired network 105.

FIG. 2 shows another prior art tethering-like approach in which a cable modem 206 effectively behaves like the handheld device 102 described above. According to the approach of FIG. 2, the tethering machine 201 is coupled to the cable modem 206 which provides access to a desired network, such as the Internet 205, through the cable modem's corresponding cable network 204. The tethering machine 201 can be configured to behave as a gateway for other tethering machines (e.g., other PCs, laptop computers, notebook computers, etc.). For example, as observed in FIG. 2 above, tethering machine 201 is coupled to remote tethering machine 207 through a local area network connection 203.

Here, the tethering machine 201 is able to distinguish between the various traffic flows that flow through the cable modem 204. For example, if tethering machines 201 and 202 both send respective request messages into the Internet 205 through the cable modem 204, tethering machine 201 is able to properly keep the response message directed to itself, and, direct the response message for the remote tethering machine 207 to the remote tethering machine 207.

For both of the prior art situations above, however, data services into the same network that the tethering machine(s) are accessing cannot be enjoyed at the gateway itself. That is, referring to FIG. 1, if tethering machine 101 is accessing the Internet 105 through the handheld device 102, a user of the handheld device 102 cannot also access the Internet 105. With respect to FIG. 2, the cable modem 206 is not designed to be used as an Internet web surfing device.

BRIEF SUMMARY

An improved tethering system is described in which a handheld device can be used by a user to reach the same network that the handheld device also provides access to for a tethering machine. Specifically, as described herein, a handheld device provides a tethering machine with access to a remote network (e.g., the Internet) through a wireless network that the handheld device is communicatively coupled to. Not only is the handheld device able to support multiple data flows between the tethering machine and the remote network, but also, the handheld device is capable of being used by a user to "surf" or otherwise access the same remote network that the handheld device provides the tethering machine with access to. For example, if the remote network is the Internet and the handheld device is a "smart phone", a user who is holding the smart phone can access the Internet concurrently with one or more applications on the tethering machine that are also accessing the Internet. Moreover, the smart phone is also capable of concurrently supporting other networked services that the smart phone is designed to provide such as voicemail services, messaging services, and telephony (cell phone) services.

Some embodiments include performing the following on a hand held device concurrently with the hand held device providing a user of the handheld device with access to a data network: receiving a packet from a tethering machine, replacing the packet's source address with a new source address, and transmitting the packet into a wireless network. Some embodiments include receiving from the wireless network a response packet, replacing the response packet's destination address with the packet's source address, and transmitting the response packet to the tethering machine.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
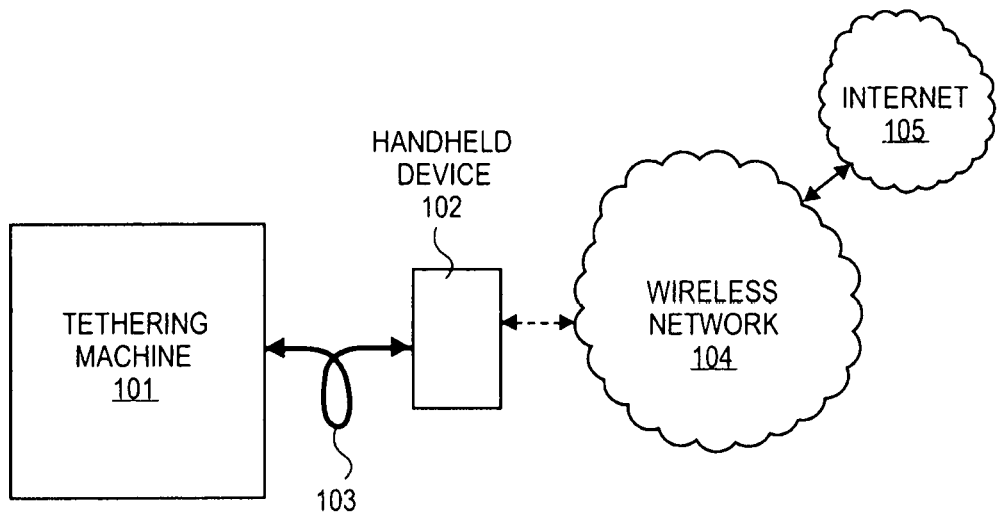
FIG. 1 (prior art) shows a first tethering system.
Figure 2:
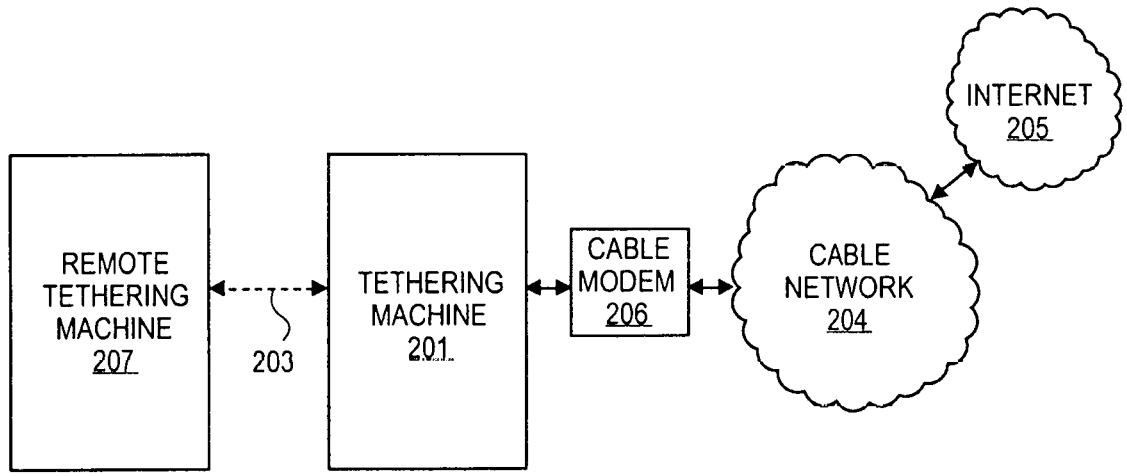
FIG. 2 (prior art) shows a second tethering system.
Figure 3:
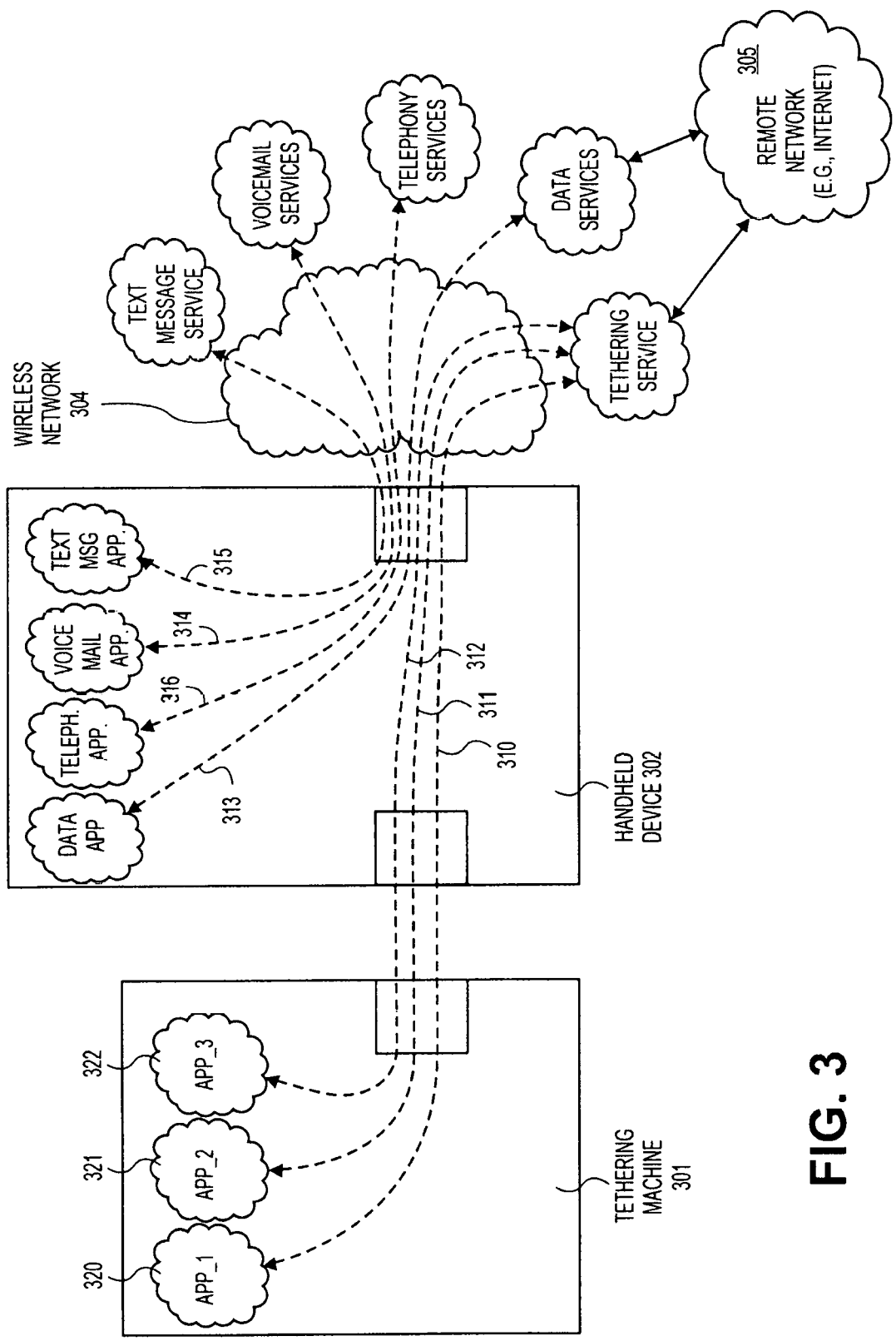
FIG. 3 shows an improved tethering system in which a handheld device can be used by a user to reach the same network that the handheld device also provides access to for a tethering machine.

FIG. 3 shows an improved tethering system in which a handheld device can be used by a user to reach the same network that the handheld device also provides access to for a tethering machine. Specifically, as observed in FIG. 3, a handheld device 302 provides a tethering machine 301 with access to a remote network 305 (e.g., the Internet) through a wireless network 303 that the handheld device 302 is communicatively coupled to. Importantly, not only is the handheld device 302 able to support multiple data flows 310, 311, 312 between the tethering machine 301 and the remote network 305, but also, the handheld device 302 is capable of being used by a user to "surf" or otherwise access the same remote network 305 that the handheld device 302 provides the tethering machine 301 with access to.

For example, if the remote network 305 is the Internet and the handheld device 302 is a "smart phone", a user who is holding the smart phone 302 can access 313 the Internet 305 concurrently with one or more applications 320, 321, 322 on the tethering machine 301 that are also accessing the Internet 305. Moreover, the smart phone 302 is also capable of concurrently supporting each of the other networked services that the smart phone 302 is designed to provide such as voicemail services, text messaging services (e.g., text messaging services and/or multi-media messaging services), and telephony (cell phone) services. The applications 320, 321, 322 on the tethering machine can also be any application capable of use on the remote network 305 (e.g., an email application, a web browser, a text/multi-media messaging application, etc.)

Through multiple flows 310 through 316, FIG. 3 visually depicts the widely dispersed concurrent functionality that the handheld device 302 is capable of supporting. That is: 1) flows 310 through 312 correspond to the tethering machine's individual data flows to/from the remote data network 304; 2) flow 313 corresponds to a data flow between the handheld device 302 and the remote network; 3) flow 316 corresponds to a telephone call that the handheld device is engaged in; 4) flow 314 corresponds to voicemail service that is accessed through the handheld device 302; and, 5) flow 315 corresponds to a messaging flow that is entertained through the handheld device 302.

Figure 4:
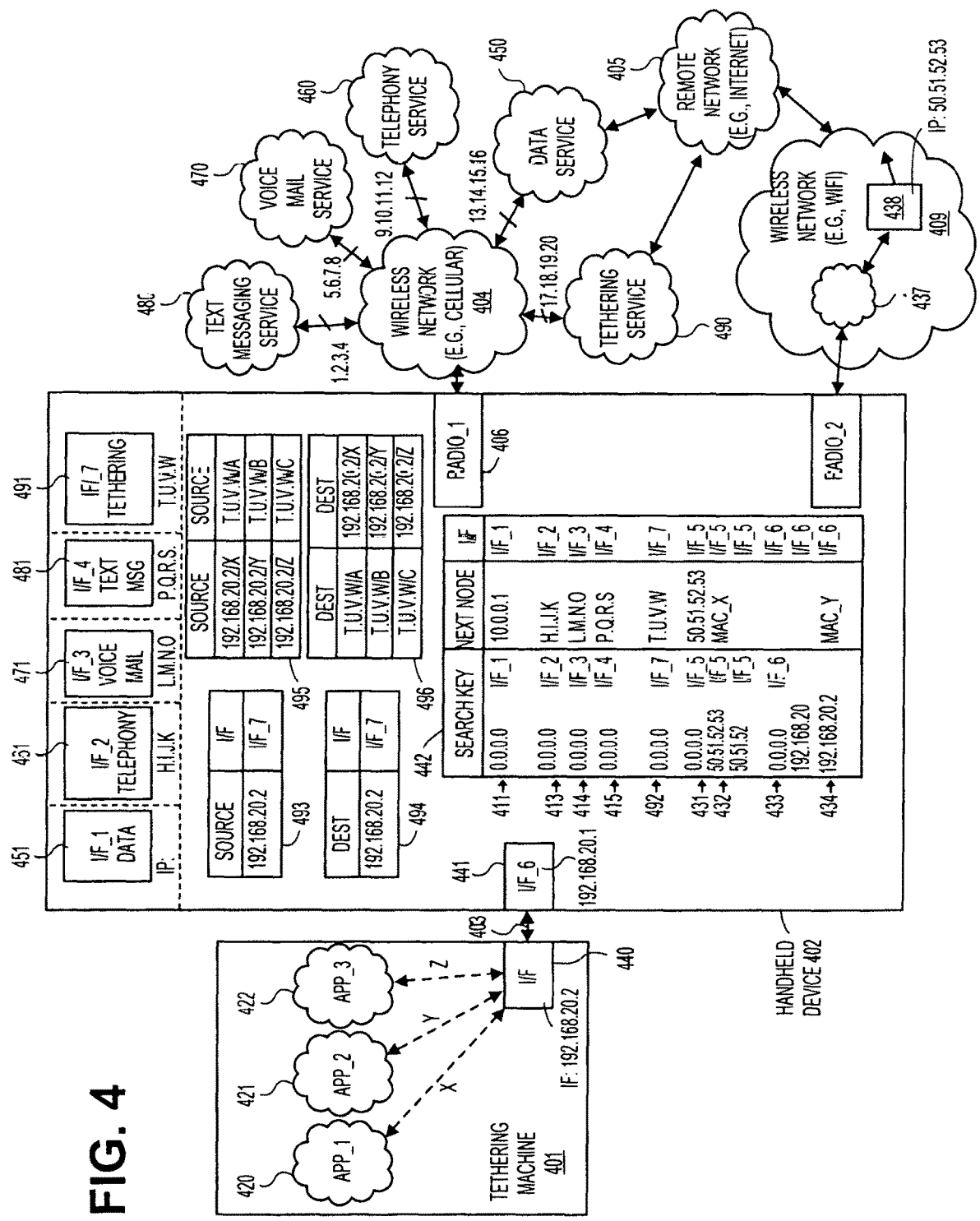
FIG. 4 shows a more detailed architecture of the improved tethering system of FIG. 3.

FIG. 4 provides a more detailed embodiment of the architecture of FIG. 3, including the routing and network translation tables that enable the widely dispersed concurrent functionality described just above. According to the depiction of FIG. 4, the tethering machine 401 includes three applications 420, 421, 422 that are communicating into remote network 405 through the handheld device 402. The tethering machine 401 is coupled to the handheld device 402 through a local connection 403 that may be implemented with a direct local connection 403 (such as a Universal Serial Bus™ (USB™) cable connection or Bluetooth™ wireless connection) or with a local area network (such as an Ethernet™ network or WiFi™ network).

Both the tethering machine 401 and handheld device 402 have respective interfaces 440, 441 for the local connection 403 (e.g., a USB interface, a Bluetooth interface, an Ethernet interface, etc.). In the particular example of FIG. 4, at the networking (IP) layer, the interfaces 440, 441 are presumed to be connected into the same subnet having a subnet address, as depicted in FIG. 4, of 192.168.20. Because the interfaces 440, 441 are presumed to be connected to the same IP subnet, they have their own associated IP addresses having identical subnet components. That is, as depicted in FIG. 4, the tethering machine interface 440 has an IP address of 192.168.20.2; and, the handheld interface 441 has an IP address of 192.168.20.1.

Each of applications 420, 421 and 422 have their own associated ports to interface 440. Specifically, when communicating through interface 440, application 420 uses port "X", application 421 uses port "Y" and application 422 uses port "Z". Thus, when application 420 sends a packet to the remote network 405, interface 440 sends a packet to interface 441 whose: i) destination address is the IP address on the remote network 405 where the packet is ultimately destined (e.g., the address for a first web site on the Internet if remote network 405 corresponds to the Internet); ii) source address is 192.168.20.2; and, iii) source port is "X".

Similarly, when application 421 sends a packet to the remote network 405, interface 440 sends a packet to interface 441 whose: i) destination address is the IP address on the remote network where the packet is ultimately destined (e.g., the address for a second web site on the Internet); ii) source address is (again) 192.168.20.2; and, iii) source port is "Y". Finally, when application 422 sends a packet to the remote network 404, interface 440 sends a packet to interface 441 whose: i) destination address is the IP address on the remote network where the packet is ultimately destined (e.g., the address for a third web site on the Internet); ii) source address is (again) 192.168.20.2; and, iii) source port is "Z".

The handheld device 402, as described in more detail immediately below, maintains a routing table 442, binding rules 493, 494 and translation tables 495, 496 that enable the handheld device 402 to properly manage the flow of packets between their respective applications on the tethering machine 401. Before describing the routing table 442, binding rules 493, 494 and translation tables 495, 496, however, an embodiment of a possible interface architecture for the handheld device 402 will first be described.

As observed in FIG. 4, the handheld device 402 is modeled as being communicatively coupled to three networks: i) a first wireless (e.g., cellular) network 404; ii) a second (e.g., WiFi™) wireless network 409; and, iii) the subnet associated with local connection 403 (192.168.20). Wireless network 404 is essentially an access mechanism to a carrier network that maintains four different services: i) a remote data service 450 that provides access to a remote data network 405 (e.g., the Internet); ii) a telephony service 460 (e.g., so the handheld device 402 can be used like a cell phone); iii) a voicemail service 470; and, iv) a messaging service 480. For simplicity, the different services are modeled as "clouds" within the carrier's network.

The handheld device 402 physically communicates into the first wireless network 404 through radio_1 406 and physically communicates into the second wireless network 409 through radio_2 407. As depicted in FIG. 4, the handheld device 402 also maintains separate interfaces 451, 461, 471, 481 for each of the different services 450, 460, 470, 480 that are available through the first wireless network 106.

That is, interface 451 (I/F_1) is used by applications within the handheld device 402 that desire to reach the remote data network 405; interface 461 (I/F_2) is used by applications within the handheld device 402 that desire telephony service; interface 471; (I/F_3) is used by applications within the handheld device 402 that desire voicemail service; and, interface 481(I/F_4) is used by applications within the handheld device 402 that desire messaging service. In an embodiment, the interfaces 451, 461, 471 and 481 are implemented with software program code that is processed on a processing core within the handheld device 402.

According to one approach, interfaces 451, 461, 471, 481 have respective addresses that correspond to an address on a remote network that their particular service pertains to. For example, the I/F_1 interface, which is used to reach the remote data network 405, has an IP address that corresponds to an address on the remote data network 405. Thus, when one of interfaces 451, 461, 471, 481 is used to send a packet to the corresponding service, packet header information is constructed that identifies the IP address of the interface as the source address of the packet (e.g., 10.0.0.1 for I/F_1 451 as depicted in FIG. 4).

Additionally, the interface subsequently directs the packet to radio_1 406 which prepares and sends the packet into the first wireless network 404 to the correct service. Here, according to one embodiment, interfaces 451, 461, 471 and 481 add additional packet header details that identify the packet as being for the type of service that the interface pertains to (e.g., interface I/F_1451 provides a destination address within the carrier's network or other identifier that is unique to data service 450).

It is worthwhile to note that in an actual implementation telephony services are implemented as non-IP traffic, and, as such, telephony flows are managed differently than the flows handled through interfaces 451, 471 and 481 (essentially, no reference to routing table 442 (described immediately below) is made along the processing path to radio_1). The present application, for the sake of example, treats voice traffic akin to Voice-over-IP (VoIP) traffic and therefore similarly with the flows of the data, voicemail and messaging services.

FIG. 4 shows a routing table 442 within the handheld device 402 having corresponding entries to route an outgoing packet to a proper interface. The routing table 442 uses a specialized search key that includes two components: a destination address of the outgoing packet, and, an interface that the outgoing packet is to be next presented to for successful outbound transmission.

In operation, when an outbound packet is generated for the handheld's outbound transmission process, the hand held device's "networking" stack constructs a search key composed of the packet's destination address and an identifier of the interface that is presumed to be the interface through which the packet will be processed. The identifier of the interface may be, for example, bound to an application that generated the packet, and/or, bound to communication session context information that is maintained for the application that generated the packet.

For instance, an identifier of the I/F_1 interface may be bound to an application that seeks to use network 405. In this case, the destination address of a packet generated by the application corresponds to an address in the remote network 405. For example, if remote network 405 corresponds to the Internet, the destination address might correspond to a particular web site on the Internet. Thus, in this case, a search key is constructed from the address of the web site and an identifier of the I/F_1 interface.

By "scoping" a search key to the I/F_1 interface in this manner, a packet of potentially any destination address will be directed to the I/F_1 interface. In the embodiment of FIG. 4, routing table entry 411 corresponds to the default entry for interface I/F_1 451. In operation, a "deepest match" search is performed on the search key. As observed in FIG. 4, a search key that includes any destination address and an identifier of the I/F_1 interface 451 will match on entry 411 because of the match on the I/F_1 component of the search key. Entry 411 points to a value of 10.0.0.1 (which is the IP address of the I/F_1 interface 451) and I/F_1 as the appropriate outbound interface.

Thus, the hand held device's networking layer, when presented with a "raw" packet for remote data network 405, performs the following: 1) constructs a search key from the packet's destination address and an identifier of an interface (I/F_1) that, e.g., the application that generated the packet is bound to; 2) performs a look up into the table to confirm the interface from which the packet will be sent (I/F_1), and, determine that interface's IP address (10.0.0.1); and, 3) encapsulate the packet with its destination address and the interface's IP address as the packet's source address (the packet may also be encapsulated with transport layer information such as TCP information). In an embodiment, an interface essentially represents a point-to-point link having a local address (the hand held device) and a remote address (the remote network). In an embodiment, the address values for the local point and the remote point are set equal to one another (e.g., 10.0.0.01 in this example).

The routing table 442 also includes entries 431, 432 for the second wireless network 409 and entries 433, 434 for the local connection 403. Entry 431 is the scoped default entry for the subnet 437 of the second wireless network 409 that the handheld device 402 is coupled to. An entry 432 for the subnet's gateway 438 that provides access to locations deeper into the second wireless network is also included. Entries 433, 434 for the local connection 403 include a scoped default entry 433 for the local connection 403 as well as an entry 434 for the destination address of the tethering machine.

A discussion of the tethering operation in conjunction with the handset's own traffic flows is now described. Recall from FIG. 3 that the handheld device may support its own data services, telephony, voicemail and messaging services while providing a tethering machine with access to a remote network. The ability of the handheld device 402 to support its own internal data, telephony, voicemail and messaging services has already been described. That is, as described above, interfaces 451, 461, 471 and 481 can be used by applications within the handheld device 402 as needed to gain access to their respective services. Applications may also use the second wireless network 409 simply by being bound to an interface for network 409 (not shown in FIG. 4), which, ultimately directs traffic to radio_2.

In the embodiment of FIG. 4 the tethering function is implemented by introducing, within the hand held device 402, another interface I/F_7 491 for the first wireless network's tethering service 490. A routing table entry 492 for the tethering service 490 is added to the routing table 442 (entries 433 and 434 may also be added if they do not already exist). Together, the tethering service interface I/F_7 491 and the new routing table entry 492 operate much the same as described above for services 450, 460, 470, 480 and their corresponding interfaces 451, 461, 471, 481 and routing table entries 411-416. The primary difference is that the "raw" packets that are presented to the networking stack and then interface I/F_7 491 are packets that are received from interface I/F_6 441 rather than an application internal to the handheld device. Binding rules 493, 494 and translation tables 495, 496 are also used to implement the tethering service.

Presently, an exemplary tethering process is described in which three different applications 420, 421, 422 running on the tethering machine 401 are provided access to remote network 405 (e.g., the Internet) through the carrier's tethering service 490.

Initially, according to one approach, the tethering process includes the handheld device 402 inquiring into the carrier as to whether tethering services are available. If so, the handheld device 402 authenticates itself to the carrier, brings up an instance of the tethering interface I/F_7 491, inserts new entries 433, 434, 492 into the routing table 442, creates inbound binding rule 493, outbound binding rule 494, inbound translation table 495 and outbound translation table 496. Here, "inbound" corresponds to packets being sent from the tethering machine 401 to the hand held device 402 during the tethering process, and, "outbound" corresponds to packets being sent from the hand held device 402 to the tethering machine 401 during the tethering process.

The inbound binding rule 493 maps the IP address of the tethering machine 401 (192.168.20.2) to the I/F_7 interface. The outbound binding rule 494 maps the IP address of the tethering interface I/F_7 491 (T.U.V.W) to the I/F_6 interface (in actuality the information of rules 493, 494 may be represented in a single entry). According to the example of FIG. 4, application 420 uses port X within the tethering machine 401, application 421 uses port Y in the tethering machine and application 422 uses port Z in the tethering machine.

Figure 5:
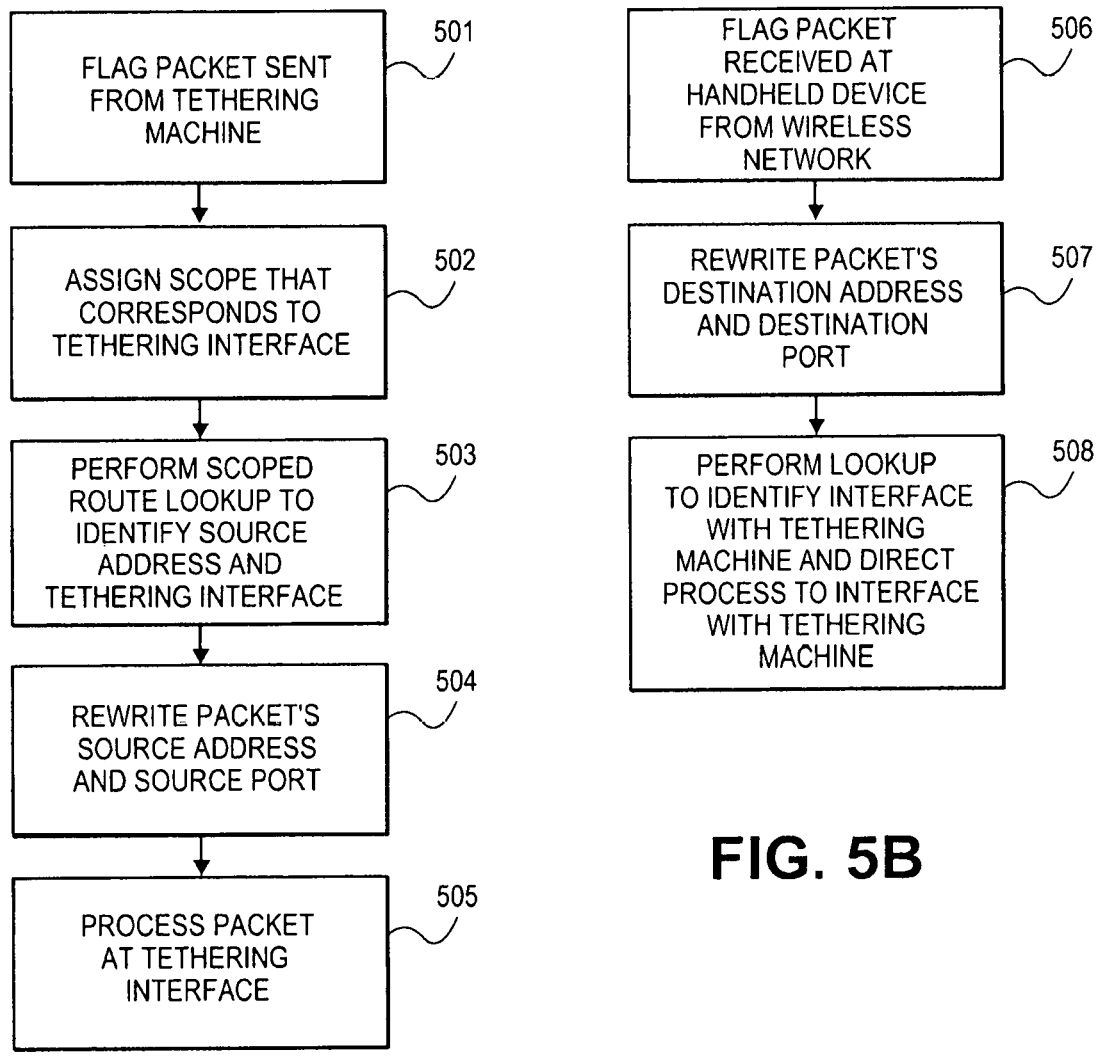
FIG. 5A shows a method for processing a packet in a direction from a tethering machine through a handheld device toward a network.
FIG. 5B shows a method for processing a packet in a direction from a network through a handheld device toward a tethering machine.

FIG. 5A shows an inbound tethering methodology for the hand held device 402 that will be referred to in conjunction with the example of applications 420, 421 and 422. When application 420 sends a packet to the tethering machine for access to remote network 404, it is received through interface I/F_6 442. Interface I/F_6 441 strips off the packet's MAC layer headers associated with local connection 403 and hands the internal IP packet to the handheld device's networking stack. This packet contains a destination address that corresponds to some destination on remote network 405 and a source address that is an address of the interface 440 on the tethering machine.

The handheld device's networking stack, being configured to flag packets received through interface I/F_6 441 and/or having a source IP address that matches that of the tethering machine (e.g., 192.168.20 or 192.168.20.2), flags 501 the incoming packet. In response to the incoming packet being flagged, the handheld device refers to binding rule 493 and assigns 502 a scope to the packet that corresponds to the tethering interface I/F_7 491.

A search key for a route lookup in the routing table 442 is then constructed having the destination IP address of the incoming packet (which may be, for example, any random Internet address) and an identifier of the I/F_7 interface 491. The route lookup 503 will match on entry 492 because of a match with the I/F_7 component of the search key. Entry 492 points to interface I/F_7, thus, the packet is next handled by interface I/F_7. Entry 492 also identifies the IP address of I/F_7 (T.U.V.W).

The following next occurs within the networking stack: 1) the packet is again flagged because its source IP address corresponds to the tethering machine (e.g., the networking stack flags on the subnet component of the source address: 192.168.20); 2) a new port instance "A" (or representation thereof) is created to map to the port within the tethering machine "X" that the packet originated from; 3) an inbound network translation entry 495 is created that maps the packet's source IP address (192.168.20.2) and source port address (X) to the IP address of the I/F_7 interface (T.U.V.W) and the new port instance (A); 4) the packet's source IP address and source port address are then rewritten 504 to be the IP address of the I/F_7 interface (T.U.V.W) and port A; 5) the packet is presented to the I/F_7 interface for transmission to the tethering service 490 through radio_1 406.

Subsequent transmissions from application 420 at port X will essentially repeat the process except that network translation entry 495 will simply be referred to, rather than created, in order to rewrite the packet's source IP address and source port address. Also, the outbound binding rule 494 and outbound network translation entry 496 for the data flow may be created concurrently with the inbound rule and inbound network translation entry 495 (or, again, a single entry may be used to effect both inbound and outbound translations).

Thus, in view of the above process, the packet is transmitted into the first wireless network with I/F_7 being identified as the "source" and not application 420 or the tethering machine 401.

In the reverse direction, a response packet that is received at the networking stack from the I/F_7 interface will identify the IP address of I/F_7 (T.U.V.W) as the destination address, and, identify port A as the destination port. The networking stack causes the packet to be flagged 506 which causes a lookup into network translation table 496. This, in turn, causes the response packet's destination address to be rewritten 507 with the IP address of the tethering machine (192.168.192.20), and, causes the response packet's destination port to be rewritten 507 as port X. An unscoped lookup (i.e., no interface component is included in the search key) into the routing table 442 is performed 508 which will match on entry 434. Entry 434 identifies I/F_6 441 as the appropriate outbound interface for the response packet. The packet is presented 508 to I/F_6 which encapsulates the packet with the correct MAC layer headers (MAC Y) sends the packet along connection 403 into the tethering machine where it is received by application 420 through port X.

Essentially the same process described above is followed for applications 421 and 422 resulting in the additional network translation entries observed in tables 495 and 496 of FIG. 4. With these entries, the handheld device 402 is able to properly direct individual flows to individual applications within the tethering machine as well as manage individual flows of different services within the handheld device.

Note that in the above described process the outbound binding rule 494 was not used because of the ability to match on entry 434 with the un-scoped lookup. In an alternative approach, the outbound binding rule 494 could be used to implement a scoped search key (i.e., including both destination address and interface identifier). This approach may be useful, for instance, where the hand held device is providing tethering services to a second tethering machine (not shown) through another interface (not shown) that happens to have the same subnet address (192.168.20) as local connection 403. In this case, the inbound binding rule 493 should be flagged based on the interface that packets are arriving from rather than their source IP address.

It is also worthwhile to point out that the scoping aspect of the routing table permits the handheld device to maintain its full functionality even in the face of sudden network access changes. For instance, assume that services 450, 460, 470 and 480 are no longer available through first wireless network 404, but only the second wireless network 409. In this case, all that needs to be done is to change the interface component of inbound rule 493 from I/F_7 to a tethering interface (not shown) for wireless network 409. Here, it goes without saying that the ability to seamlessly and quickly adapt to changing network environments is a pertinent feature of a mobile device.

It also worthwhile to point out that although the discussion above only discussed a situation where the hand held device and the tethering machine were accessing the same remote data network, the teachings of the above discussion easily lend themselves to a situation where the hand held device and tethering machine are accessing different data networks. For example, with another interface (not shown) used to access a data network private to the carrier (not shown) (e.g., that maintains private "web" sites for information that is administered by the carrier) while the tethering machine is provided access to remote network 405.

The specifications of the following applications, all filed on Sep. 30, 2008, are incorporated by reference into the present specification to the extent they are consistent with the present specification: 1) application Ser. No. 12/242,485 entitled "Outbound Transmission Of Packet Based On Routing Search Key Constructed From Packet Destination Address And Outbound Interface"; 2) application Ser. No. 12/242,499, entitled "Source Address Based Routing Process"; 3) application Ser. No. 12/242,533 entitled "Routing Table Lookup Algorithm Employing Search Key Having Destination Address And Interface Component"; 4) application Ser. No. 12/242,548 entitled "Routing Table Build Algorithm For A Routing Table That Uses A Search Key Constructed From Packet Destination Address And Outbound Interface".

Figure 6:
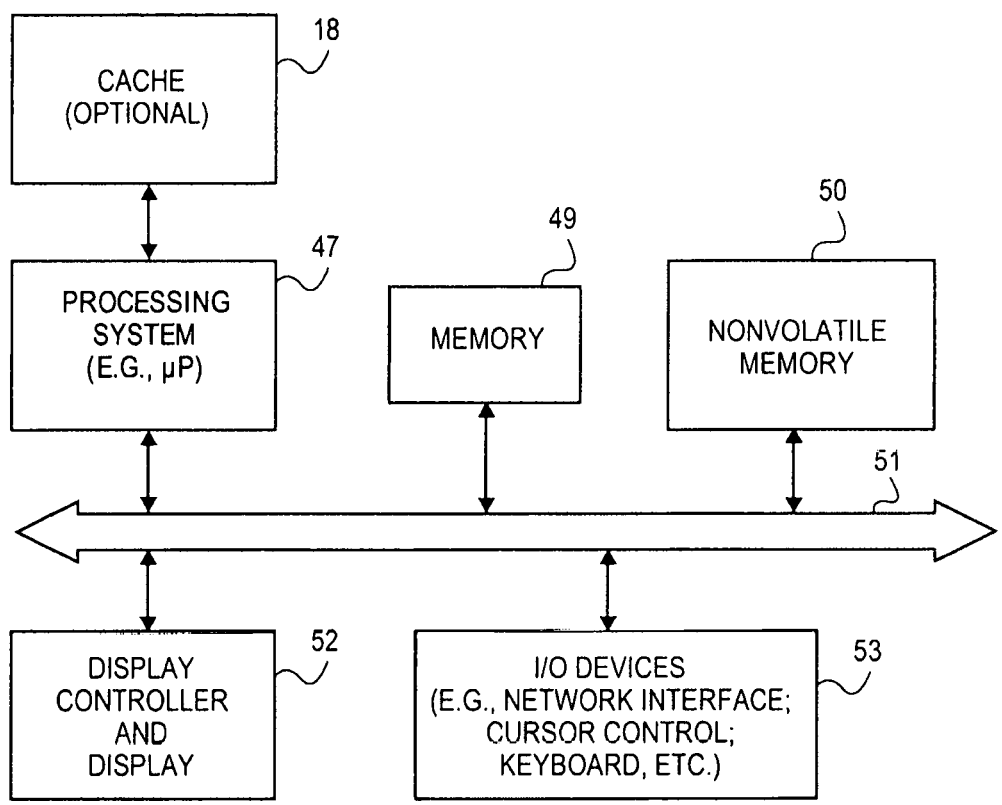
FIG. 6 shows an embodiment of a generic handheld device platform.

FIG. 6 shows one example of a typical computing system (or "computer system") which may be used with the present invention. Note that while FIG. 10 illustrates various components of a computer system, it is not intended to represent any particular architecture or manner of interconnecting the components as such details are not germane to the present invention. For example, the architecture of FIG. 6 may apply to either or both of the above described tethering machine and handheld device. It will also be appreciated that smart phones, personal digital assistants (PDAs), cellular telephones, handheld computers, media players (e.g. an iPod), entertainment systems, devices which combine aspects or functions of these devices (e.g. a media player combined with a PDA and a cellular telephone in one device), an embedded processing device within another device, network computers, a consumer electronic device, and other data processing systems which have fewer components or perhaps more components may also be used with or to implement one or more embodiments of the present invention. The computer system of FIG. 6 may, for example, be a Macintosh computer from Apple Inc. The system may be used when programming or when compiling or when executing the software described.

As shown in FIG. 6, the computer system 45, which is a form of a data processing system, includes a bus 51 which is coupled to a processing system 47 and a volatile memory 49 and a non-volatile memory 50. The processing system 47 may be a microprocessor from Intel which is coupled to an optional cache 48. The bus 51 interconnects these various components together and also interconnects these components to a display controller and display device 52 and to peripheral devices such as input/output (I/O) devices 53 which may be mice, keyboards, modems, network interfaces, printers and other devices which are well known in the art. Typically, the input/output devices 53 are coupled to the system through input/output controllers. The volatile memory 49 is typically implemented as dynamic RAM (DRAM) which requires power continually in order to refresh or maintain the data in the memory. The nonvolatile memory 50 is typically a magnetic hard drive, a flash semiconductor memory, or a magnetic optical drive or an optical drive or a DVD RAM or other types of memory systems which maintain data (e.g. large amounts of data) even after power is removed from the system. Typically, the nonvolatile memory 50 will also be a random access memory although this is not required. While FIG. 6 shows that the nonvolatile memory 50 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 51 may include one or more buses connected to each other through various bridges, controllers and/or adapters as is well known in the art.

It will be apparent from this description that aspects of the present invention may be embodied, at least in part, in software. That is, the techniques may be carried out in a computer system or other data processing system in response to its processor, such as a microprocessor, executing sequences of instructions contained in a machine readable storage medium such as a memory (e.g. memory 49 and/or memory 50). In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the processing system 47.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A handheld electronic device comprising:
one or more radios; and
a processor coupled to the one or more radios, wherein the processor is configured to:
receive first packets of a first application on the handheld electronic device, wherein the first packets are destined for a remote network;
receive second packets from a tethered device, wherein the second packets are destined for the remote network; and
concurrently transmit the first packets and the second packets to the remote network via the one or more radios.

2. The handheld electronic device of claim 1, wherein the processor is further configured to, while concurrently transmitting the first and second packets to the remote network, enable at least one application of the handheld electronic device, wherein the at least one application includes a voicemail application, a telephony application, or a text message application.

3. The handheld electronic device of claim 2, wherein the processor is further configured to:
use a first radio of the one or more radios to transmit the second packets to the remote network; and
use a second radio of the one or more radios to concurrently transmit third packets associated with the at least one application.

4. The handheld electronic device of claim 3, wherein the processor is further configured to use the first radio to transmit the first packets to the remote network.

5. The handheld electronic device of claim 3, wherein the processor is further configured to use the second radio to transmit the first packets to the remote network.

6. The handheld electronic device of claim 1, wherein the processor is further configured to:
while concurrently transmitting the first and second packets to the remote network, enable at least two applications of: a voicemail application, a telephony application, or a text message application.

7. The handheld electronic device of claim 1, wherein the processor is further configured to:
receive multiple data flows from the tethered device, wherein packets of the multiple data flows are associated with one or more different applications of the tethered device, and wherein the packets of the multiple data flows include the second packets.

8. The handheld electronic device of claim 1, wherein the first packets correspond to a data service of the handheld electronic device and the second packets correspond to a data service of the tethered device.

9. The handheld electronic device of claim 1, wherein the first packets are presented to a first application interface of the handheld electronic device for transmission to the remote network via a radio of the one or more radios, and the second packets are presented to a second application interface of the handheld electronic for transmission to the remote network via the radio, and wherein the first and second application interfaces are different from each other.

10. The handheld electronic device of claim 9, wherein the second packets transmitted to the remote network identify the second application interface as a source address for the second packets rather than an address of the tethered device.

11. The handheld device of claim 9, wherein the second packets are associated with a second application operating on the tethered device and are received via a first port of a third interface, and wherein the processor is further configured to:
receive third packets from a third application operating on the tethered device via a second port of the third interface, wherein the third packets are destined for the remote network; and
transmit the third packets to the remote network via the one or more radios.

12. The handheld device of claim 11, wherein the third packets transmitted to the remote network identify the second interface as a source address for the third packets rather than an address of the tethered device.

13. A non-transitory computer-readable medium having instructions stored therein, which when executed by a processor of a handheld electronic device causes the processor to perform operations, the operations comprising:
receiving first packets of a first application on the handheld electronic device, wherein the first packets are destined for a remote network;
receiving second packets from a tethered device, wherein the second packets are destined to the remote network;
concurrently transmitting the first packets and the second packets to the remote network using one or more radios; and
enabling at least one application of the handheld electronic device to transmit packets using the one or more radios concurrently with the transmitting of the first packets and the second packets.

14. The non-transitory computer-readable medium of claim 13, wherein the operations further comprise:
using a first radio of the one or more radios to transmit the second packets to the remote network; and
using a second radio of the one or more radios to concurrently transmit third packets associated with the at least one application.

15. The non-transitory computer-readable medium of claim 14, wherein the operations further comprise using the first radio of the one or more radios to transmit the first packets to the remote network.

16. The non-transitory computer-readable medium of claim 14, wherein the operations further comprise using the second radio of the one or more radios to transmit the first packets to the remote network.

17. The non-transitory computer-readable medium of claim 13, wherein the operations further comprise:
using a first radio of the one or more radios to concurrently transmit: the first packets, the second packets, and packets associated with the at least one application; and
subsequently using a second radio of the one or more radios to transmit the packets associated with the at least one application of the handheld electronic device.

18. The non-transitory computer-readable medium of claim 13, wherein the operations further comprise receiving multiple data flows from the tethered device, wherein packets of the multiple data flows are associated with one or more different applications of the tethered device, and wherein the packets of the multiple data flows include the second packets.

19. The non-transitory computer-readable medium of claim 13, wherein the first packets are presented to a first application interface of the handheld electronic device for transmission to the remote network via a radio of the one or more radios, and the second packets are presented to a second application interface of the handheld electronic for transmission to the remote network via the radio, and wherein the first and second application interfaces are different from each other.

20. A method comprising:
receiving first packets of a first application on the handheld electronic device, wherein the first packets are destined for a remote network;
receiving second packets from a tethered device, wherein the second packets are destined to the remote network;
concurrently transmitting the first packets and the second packets to the remote network; and
receiving multiple data flows from the tethered device, wherein packets of the multiple data flows are associated with one or more different applications of the tethered device, and wherein the packets of the multiple data flows include the second packets.

* * * * *

UNITED STATES PATENT AND TRADEMARK OFFICE
CERTIFICATE OF CORRECTION

PATENT NO. : 10,841,962 B2
APPLICATION NO. : 15/998980
DATED : November 17, 2020
INVENTOR(S) : Cahya Masputra Page 1 of 1

It is certified that error appears in the above-identified patent and that said Letters Patent is hereby corrected as shown below:

On the Title Page

Item (56), In the References Cited:
Page 2, Column 2, Line 5, "2010/0267368 A1 12/2010 Masputra" should read --2010/0267368 A1 10/2010 Masputra--.

Signed and Sealed this
Twenty-first Day of September, 2021

Drew Hirshfeld
*Performing the Functions and Duties of the
Under Secretary of Commerce for Intellectual Property and
Director of the United States Patent and Trademark Office*